US006617372B2

(12) United States Patent
Senak

(10) Patent No.: US 6,617,372 B2
(45) Date of Patent: Sep. 9, 2003

(54) PROCESS OF MAKING POLYMERIC HYDROGEL PRODUCTS

(75) Inventor: Laurence Senak, West Orange, NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 10/047,525

(22) Filed: Oct. 23, 2001

(65) Prior Publication Data

US 2003/0077447 A1 Apr. 24, 2003

(51) Int. Cl.$^7$ .............................. C08F 2/46; C08F 2/16; C08K 3/00
(52) U.S. Cl. .............................. 522/84; 522/84; 522/85; 522/149; 522/150; 522/151; 522/152; 522/153; 524/800; 524/804; 524/808; 524/816; 524/819; 524/823; 524/827; 524/831; 524/832; 524/833; 524/849; 524/853; 524/854; 524/881; 524/916
(58) Field of Search .............................. 524/800, 804, 524/849, 853, 854, 881, 916, 808, 816, 819, 820, 823, 827, 831, 832, 833; 522/84, 85, 149, 150, 151, 152, 153

(56) References Cited

U.S. PATENT DOCUMENTS

| 4,109,074 A | * | 8/1978 | Creighton et al. .......... 526/320 |
| 4,192,827 A | * | 3/1980 | Mueller et al. ............. 525/123 |
| 4,258,715 A | * | 3/1981 | Goble ........................ 604/336 |
| 4,354,907 A | * | 10/1982 | Machi et al. ................ 522/175 |
| 4,361,552 A | * | 11/1982 | Baur, Jr. ..................... 424/582 |
| 4,556,056 A | * | 12/1985 | Fischer et al. .............. 604/304 |
| 4,680,336 A | * | 7/1987 | Larsen et al. ............... 524/548 |
| 4,690,788 A | * | 9/1987 | Yada et al. .................. 264/494 |
| 4,880,886 A | * | 11/1989 | Kondo et al. ................. 526/80 |
| 4,904,749 A | * | 2/1990 | Brusky et al. .............. 526/201 |
| 5,258,473 A | * | 11/1993 | Niessner et al. .............. 526/78 |
| 5,409,771 A | * | 4/1995 | Dahmen et al. ............. 428/327 |
| 5,432,210 A | * | 7/1995 | Bogan, Jr. ................... 523/201 |
| 5,561,190 A | * | 10/1996 | Avison et al. .............. 524/522 |
| 5,596,056 A | * | 1/1997 | Nambu et al. .............. 526/207 |
| 5,667,885 A | * | 9/1997 | Nguyen et al. ............. 428/327 |
| 6,180,255 B1 | * | 1/2001 | Valentini et al. ............ 428/500 |
| 6,197,863 B1 | * | 3/2001 | Eck et al. ................... 524/430 |
| 6,541,565 B2 | * | 4/2003 | Hood et al. ................. 524/808 |
| 6,548,597 B2 | * | 4/2003 | Hood et al. ................. 524/804 |

* cited by examiner

Primary Examiner—Nathan M. Nutter
Assistant Examiner—Sanza L. McClendon
(74) Attorney, Agent, or Firm—Walter Katz; William J. Davis; Marilyn J. Maue

(57) ABSTRACT

What is described is a polymeric hydrogel product of a stable, aqueous polymeric composition which composition forms a clear to translucent film upon application to a substrate, and includes, by weight, 5–75% of (a) a water-soluble polymer having (b) in situ-formed, substantially water-insoluble resinous particles of said polymer substantially uniformly dispersed therein, and (c) 25–95% of water, made by irradiating the composition with high energy electron beam or gamma-radiation.

15 Claims, 1 Drawing Sheet

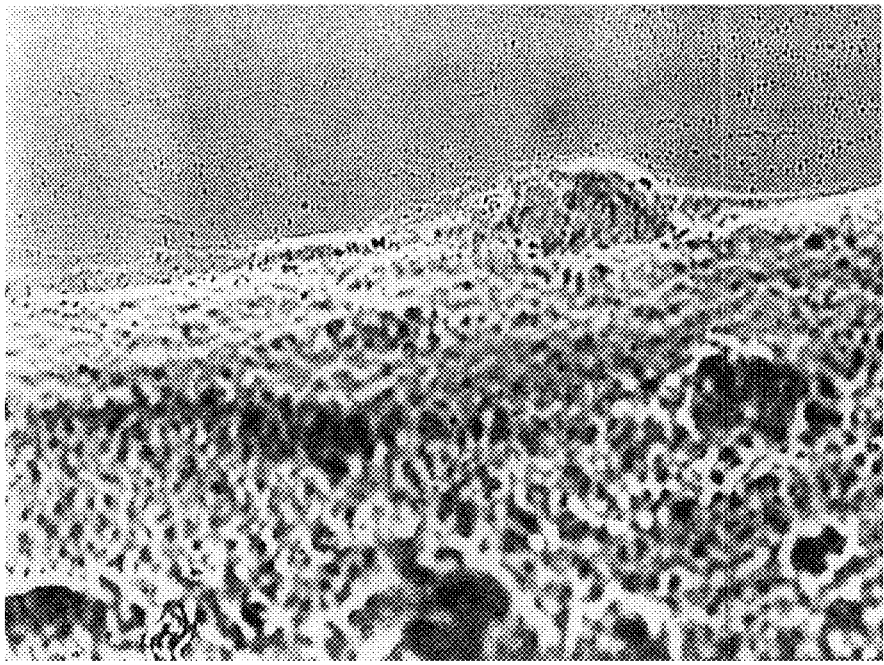

PROCESS OF MAKING POLYMERIC HYDROGEL PRODUCTS

CROSS-REFERENCE TO RELATED U.S. PATENT APPLICATIONS

This application is related to co-pending U.S. patent application Ser. No. 09/663,010, filed Sep. 15, 2000, Ser. No. 09/784,268, filed Feb. 15, 2001 and Ser. No. 09/881,906, filed Jun. 15, 2001.

BACKGROUND OF THE INVENTION

1. Field of the Invention

This invention relates to polymeric hydrogels, and, more particularly, to a polymeric hydrogel product of a non-continuous, vinyl lactam polymeric composition having two phases therein, obtained by irradiating the composition with high energy electron beam or gamma-radiation.

2. Description of the Prior Art

Polymeric compositions of vinyl lactam monomers generally are one-phase, soluble, high viscosity materials. These compositions are found in a variety of commercial applications such as film formers, dye transfer inhibitors, rheology modifiers, dispersants, excipients, and drug delivery. Aqueous gels of these monomers can also be prepared by light covalent or associative crosslinking of polymer chains resulting in a highly swellable, one-phase material of high viscosity.

The prior art for these compositions are represented by the following patents.

Niessner, in U.S. Pat. Nos. 5,149,750 and 5,180,804, disclosed finely divided, water-swellable gel-like, water-swellable copolymers by polymerization of comonomers in the presence of a surfactant.

Liu, in U.S. Pat. No. 5,997,855, described a homogeneous terpolymer for hair care use, however, without a crosslinking agent.

Kopolow, in U.S. Pat. No. 5,130,121, described personal care compositions containing a stabilized cosmetically-active product obtained by in situ polymerization of a water-soluble vinyl monomer in the presence of discrete microdroplets of a cosmetically-active oil in water.

Blankenburg, in U.S. Pat. Nos. 5,635,169 and 6,107,397, also described uncrosslinked aqueous copolymer dispersions of nonionic water-soluble monomers with N-vinyl groups, and hydrophobic monomers.

Steckler, in U.S. Pat. No. 3,878,175, disclosed highly absorbent spongy gel polymer materials by simultaneously copolymerizing and partially crosslinking a comonomer mixture of an alkyl acrylate and a heterocyclic N-vinyl monomer containing a carbonyl functionality in the presence of a hydrophobic liquid diluent in which the final polymer is insoluble.

Markus, in U.S. Pat. No. 2,810,716, described a process for making swellable resins by copolymerizing monomers in the presence of a water-soluble non-redox divalent-ion containing salt.

Tseng, in U.S. Pat. Nos. 5,393,854 and 5,717,045, disclosed a one-phase, aqueous gel of crosslinked copolymers of vinyl pyrrolidone and dimethylaminoethyl methacrylate for use in hair care products. The crosslinking agent was 1-vinyl-3-(E)-ethylidene pyrrolidone. The gels had a Brookfield viscosity of between 60,000 and 100,000.

These references illustrate the desire of the art to produce a continuous network of polymer molecules, or microgel, in a one-phase system, and of high viscosity.

However, none of these references show, describe or suggest a two-phase polymeric hydrogel product.

Accordingly, it is an object of the present invention to provide a polymeric hydrogel product of an aqueous polymeric composition which is a combination of a film-forming polymer and substantially uniformly dispersed, minute resinous particles that, under suitable light magnification, shows the presence of two discrete phases therein, one of which is a water-soluble polymer, and the other is in situ-formed, water-insoluble resinous particles.

Another object of the invention is to provide such a polymeric hydrogel product for use in making inkjet printing films as described in detail in the aforementioned copending patent applications.

A feature of the invention is the provision of a polymeric hydrogel formed by irradiating a two-phase polymeric composition with high energy electron beam or gamma-radiation.

IN THE DRAWING

The FIGURE is a photomicrograph of the aqueous polymeric hydrogel product of the invention showing the presence of two discrete phases therein.

DESCRIPTION OF THE INVENTION

What is described herein is a polymeric hydrogel product of a stable, aqueous polymeric composition which composition forms a clear-to-translucent film upon application to a substrate comprising, by weight, 5–75% of (a) a water-soluble polymer having (b) in situ-formed, substantially water-insoluble resinous particles of said polymer substantially uniformly dispersed therein, and (c) 25–95% of water, made by irradiating the polymeric composition with high energy electron beam or gamma-radiation.

The polymeric hydrogels of the invention are further characterized by being quite thick, tacky, elastic and transparent.

Suitably 1 Mrad of energy is applied for one second to the polymeric composition to form the polymeric hydrogel. Lower and higher amounts of energy, and for longer times, may be used if desired to form thinner or thicker hydrogels, even up to solids, if necessary, respecting the particular application sought.

The function of electron beam or gamma-radiation on the polymeric composition is to crosslink the polymer by physical rather than chemical means, in a rapid and efficient manner.

Preferably the polymer is vinyl lactam polymer, e.g. polyvinylpyrrolidone (PVP), or poly(vinylcaprolactam) (PVCL); or a copolymer of PVP and/or PVCL, including one or more comonomers, e.g. dimethylaminopropyl(meth)acrylamide (DMAPMA) or dimethylaminoethyl(meth)acrylate (DMAEMA). Most preferably the polymer is a vinyl lactam polymer copolymerized with a methacrylate/acrylate or methacrylamide/acrylamide comonomer.

In this invention, the polymeric composition includes particles having a size of <500μ, preferably <100μ, and optimally between >1 nm and <500 μ.

Suitably the polymeric composition includes a substantially water-insoluble polymer which is a crosslinked or branched polymer, neutralized and/or quaternized, and/or functionalized quaternized. The ratio of (a):(b) suitably is 20–95% to 5–80%, preferably 20–75% to 25–80%, and the crosslinking agent is a substantially water-insoluble compound, preferably pentaerythritol triallyl ether (PETE), or pentaerythritol tetraacrylate (PETA), most preferably at least partially soluble in water, and the crosslinking agent suitably is present in an amount of 0.02–0.5% by weight of said composition, most preferably 0.05–0.3%.

Accordingly, as part of the invention, there is first provided a stable, aqueous polymeric composition by a process which includes the steps of providing a reaction mixture of a water-soluble vinyl monomer, optionally with one or more water-soluble comonomers, and a predetermined amount of a crosslinking agent and water, heating the mixture, then periodically adding a predetermined amount of an initiator, and polymerizing the mixture at about 30–130° C., optionally further including the step of diluting with water during or after the polymerization.

Preferably the crosslinking agent is present in the process in an amount of 0.02–0.5 wt. % based on total monomers, and, most preferably, the crosslinking agent is PETE or PETA. The initiator suitably is an azo initiator.

Accordingly, there is first provided herein an aqueous polymeric composition having two phases therein, a water-soluble polymeric phase and a discrete, water-insoluble polymer particle phase which is generated in-situ during the polymerization of the monomers.

The stable, aqueous polymeric composition is characterized by forming a clear to translucent film upon application to a substrate; it comprises, by weight, about 5–75% of (a) a water-soluble polymer having (b) in situ-formed, substantially water-insoluble resinous particles of said polymer substantially uniformly dispersed therein, and (c) about 25–95% of water.

The aqueous polymeric composition is then irradiated with high energy electron beam or gamma-radiation to form the desired polymeric hydrogen composition.

The invention will now be described with reference to the following examples, in which Examples 1–8 describe the preparation of the polymeric composition itself, and Examples 9–10 describe the preparation of the polymeric hydrogels of the invention by irradiation of the composition of Examples 1–8.

EXAMPLE 1

Polymeric Composition of PVP/PETE

1. To a 2-l kettle fitted with a nitrogen inlet tube, thermocouple, agitator, and feed lines was added 131.81 g of VP, 756 g DI water and 0.197 g PETE (0.15% based upon monomer).
2. Purged with nitrogen subsurface for 30 minutes.
3. Heated to 70° C.
4. Initiator was added at 0 and 30 minutes. 0.48 g of Vazo® 67 in 1.5 g IPA was added for each shot and two 1.0 g IPA washes were made.
5. Held the reaction temperature overnight at 70° C.
6. When residual VP was below 400 ppm, diluted the batch with 320.04 g DI water.
7. Cooled batch to 50° C.
8. Added 0.15 to 0.19% BTC 50 NF as preservative.
9. The product was a 2-phase, polymerization composition with 40 to 70% resinous particles, whose soluble fraction had a molecular weight of 1,200,000 to 1,500,000.

EXAMPLE 2

VP/DMAPMA/PETE

1. To a 2-l kettle fitted with a nitrogen inlet tube, thermocouple, agitator, and feed lines was added 87.15 g of vinyl pyrrolidone monomer, (VP), 697 g DI water and 0.275 g (0.25% based upon monomer) of pentaerythritol triallyl ether (PETE) as crosslinker.
2. Purged with nitrogen subsurface for 30 minutes.
3. Heated to 70° C.
4. In a separate container weighed out 22.69 g of dimethylaminopropyl methacrylamide (DMAPMA).
5. With kettle temperature at 70° C., stop subsurface nitrogen purge and purged above surface. Precharged 1.1 g DMAPMA from container.
6. Started continuous addition of the remaining DMAPMA (21.86 g) over 210 minutes at a flow rate 0.11 ml/minute. Once the DMAPMA flow started, initiated with first shot of Vazo® 67 in isopropanol (IPA) (Time 0).
7. Initiator was added in 5 separate shots at 0, 30, 60, 150 and 210 minutes. 0.2 g of Vazo® 67 in 1.0 g IPA was added for each shot and two 0.5 g IPA washes were made.
8. Held the reaction temperature overnight at 70° C.
9. When residual VP level was below 400 ppm, diluted the batch with 266.7 g of DI water.
10. Cooled batch to 50° C.
11. Neutralized the batch with conc. HCl to pH of 6.2–6.8 at 50° C. Room temperature pH was 6.8–7.2. Required approximately 14 g of conc. HCl.
12. Added 0.15 to 0.19% BTC 50 NF as preservative.
13. A two-phase, aqueous polymeric composition was obtained.

EXAMPLE 3

The process of Example 2 was repeated using 5 separate shots of 0.3 g each of Vazo® 67 in 1.0 g of IPA. A similar polymeric composition as in Example 1 was obtained.

EXAMPLE 4

The process of Example 2 was repeated using 5 separate shots of 0.4 g each of Vazo® 67 in 1 g of IPA, and 0.3 g of crosslinker. A similar polymeric composition was obtained.

EXAMPLE 5

VP/DMAPMA/PETE Quaternized with Diethyl Sulfate

1. To a 2-l, kettle fitted with a nitrogen inlet tube, thermocouple, agitator, and feed lines was added 96.00 g of VP, 702.7 g DI water and 0.36 g PETE (0.30% based upon monomer).
2. Purged with nitrogen subsurface for 30 minutes.
3. Heated to 70° C.
4. In a separate container weighed out 24.0 g DMAPMA and 74.7 g DI water. Purged with nitrogen.
5. When kettle temperature was at 70° C., stopped subsurface nitrogen purge and purged above surface. Precharged 4.94 g DMAPMA/water from container.
6. Started continuous addition of the remaining DMAPMA/water (93.76 g) over 210 minutes. Flow rate 0.48 ml/minute. Once DMAPMA/water flow started, initiated with first shot of Vazo® 67 in IPA (Time 0).
7. Initiator was added at 0, 30, 60, 150 and 210 minutes. 0.44 g of Vazo 67 in 1.3 g IPA was added for each shot and two 0.7 g IPA washes were made.
8. Held the reaction temperature overnight at 70° C.
9. When residual VP was below 400 ppm, diluted the batch with 297.5 g DI water.
10. Cooled batch to 50° C.
11. Neutralized the batch with 19.56 g diethyl sulfate (DES) over 60 minutes; at flow rate of 0.28 g/ml.

12. Stirred for 2 hours.
13. Product.

EXAMPLE 6

VP/DMAPMA/PETE Neutralized with Benzophenone-4

1. To a 2-l kettle fitted with a nitrogen inlet tube, thermocouple, agitator, and feed lines was added 87.15 g of HPVP, 630 g DI water and 0.33 g PETE (0.30% based upon monomer).
2. Purged with nitrogen subsurface for 30 minutes.
3. Heated to 70° C.
4. Weighed out 22.69 g DMAPMA and 67 g DI water. Purged with nitrogen.
5. When kettle temperature was at 70° C., stopped subsurface nitrogen purge and purged above surface. Precharged 4.23 g DMAPMA/water from container.
6. Started a continuous addition of the remaining DMAPMA/water (85.46 g) over 210 minutes. Flow rate 0.40 ml/minute. Once DMAPMA/water flow started, initiated with first shot of Vazo® 67 in IPA (Time 0).
7. Initiator was added at 0, 30, 60, 150 and 210 minutes. 0.4 g of Vazo 67 in 1.0 g IPA was added for each shot and two 0.5 g IPA washes were made.
8. Held the reaction temperature overnight at 70° C.
9. When residual VP was below 400 ppm, diluted the batch with 266.7 g DI water.
10. Cooled batch to 50° C.
11. Neutralized the batch with benzophenone-4, 5 to 99 mole % (2 to 38.6 g respectively). Continued neutralization with sulfuric acid to pH of 6.8 to 7.8 at 50° C.
12. Cooled and discharged.
13. Product.

EXAMPLE 7

VP/DMAPMA/PETA

1. To a 2-l kettle fitted with a nitrogen inlet tube, thermocouple, agitator, and feed lines was added 104.58 g of HPVP, 756 g DI water and 0.59 g pentaerythritol tetra acrylate (0.30% based upon monomer).
2. Purged with nitrogen subsurface for 30 minutes.
3. Heated to 70° C.
4. In a separate container, weighed out 27.23 g DMAPMA and 80.4 g DI water. Purged with nitrogen.
5. When kettle temperature was at 70° C., stopped subsurface nitrogen purge and purged above surface. Precharged 5.38 g DMAPMA/water from container.
6. Started continuous addition of the remaining DMAPMA/water (102.25 g) over 210 minutes. Flow rate 0.52 ml/minute. Once DMAPMA/water flow started, initiated with first shot of Vazo® 67 in IPA (Time 0).
7. Initiator was added at 0, 30, 60, 150 and 210 minutes. 0.16 g of Vazo® 67 in 1.0 g IPA was added for each shot and two 0.5 g IA washes were made.
8. Held the reaction temperature overnight at 70° C.
9. When VP was below 400 ppm, diluted the batch with 266.7 g DI water.
10. Cooled batch to 50° C.
11. Neutralized the batch with conc. sulfuric acid to pH of 6.6 to 7.8 at 25° C.
12. Added 0.15 to 0.19% BTC 50 NF as preservative.
13. Product.

EXAMPLE 8

VP/DMAEMA/PETE

1. To a 2-l kettle fitted with a nitrogen inlet tube, thermocouple, agitator, and feed lines is added 87.15 g of HPVP, 630 g DI water and 0.33 g (0.30% based upon monomer) pentaerythritol triallyl ether.
2. Purged with nitrogen subsurface for 30 minutes.
3. Heated to 70° C.
4. In a separate container, weighed out 22.69 g DMAEMA and 67 g DI water. Purged with nitrogen.
5. When kettle temperature was at 70° C., stopped subsurface nitrogen purge and purged above surface. Precharged 4.23 g DMAEMA/water from container.
6. Started continuous addition of the remaining DMAEMA/water (85.46 g) over 210 minutes. Flow rate 0.40 ml/minute. Once DMAEMA/water flow started initiator addition with first shot of Vazo 67 in IPA (Time 0).
7. Initiator was added at 0, 30, 60, 150, and 210 minutes. 0.4 g of Vazo 67 in 1.0 g IPA was added for each shot and two 0.5 g IPA washes were made.
8. Held the reaction temperature overnight at 70° C.
9. When VP was below 400 ppm, diluted the batch with 266.7 g DI water.
10. Cooled batch to 50° C.
11. Neutralized the batch with conc. HCl to pH of 6.2 to 6.8 at 50° C. Room temperature pH will be 6.8 to 7.2. Required approximately 14 g of conc. HCl.
12. Added 0.15 to 0.19% BTC 50 NF as preservative.

EXAMPLE 9

Preparation of Polymeric Hydrogel Compositions of Invention

Polymer composition in an amount of 15.0 g (a 10.8% polymer solids solution in water) of the compositions of PVP/PETE (Example 1); PVP/DMAPMA/PETE (11.7% polymer solids) (Example 4) neutralized with sulfuric acid and PVP/DMAPMA/PETE (11.5% polymer solids) (Example 4) were separately packaged in sealed polyethylene bags. These bags then were sealed in a second set of bags to prevent loss of moisture. The test samples then were irradiated in a high energy electron beam with a total dosage of 1 Mrad for one second. Upon irradiation, all three solutions formed thick, tacky, elastic and transparent hydrogels, as shown in the FIGURE. The hydrogels were weighed at nominally 0.15% sample/solution (w/v) concentration in a GPC mobile phase and examined by GPC for residual soluble polymer. The residual soluble polymer present was found to be nominally 6%, 4% and 5%, respectively, for the polymer hydrogel solutions. Thus conversion of the polymeric composition to the polymeric hydrogel was accomplished at a conversion of 94%, 96% and 95%, respectively.

EXAMPLE 10

The procedure of Example 9 is repeated using the polymeric compositions of Example 2, 3 and 5–8, with similarly prepared polymeric hydrogel products.

While the invention has been described with particular reference to certain embodiments thereof, it will be understood that changes and modifications may be made which are within the skill of the art. Accordingly, it is intended to be bound only by the following claims, in which:

What is claimed is:

1. A method of making a polymeric hydrogel product which comprises (1) providing a stable, aqueous polymeric composition which forms a clear to translucent film upon application to a substrate comprising, (a) a water-soluble polymer having (b) in situ-formed, substantially water-insoluble resinous particles of said polymer substantially uniformly dispersed therein, and (c) water, and (2) irradiating said polymeric composition with high energy electron beam or gamma-radiation.

2. A method according to claim 1 wherein said hydrogel product is characterized by being tacky, elastic and transparent.

3. A method according to claim 1 wherein (1) comprises, by weight 5–75% of (a) and (b), and 25–95% of water.

4. A method according to claim 1 wherein 1 Mrad of energy is irradiated for one second onto the polymeric composition.

5. The polymeric hydrogel product of the method of claim 1.

6. A method according to claim 1 wherein said polymer is polyvinylpyrrolidone (PVP), poly(vinylcaprolactam) (PVCL), a copolymer of PVP and PVCL, or, optionally, including one or more comonomers.

7. A method according to claim 6 wherein said comonomer is dimethylaminopropyl(meth)acrylamide (DMAPMA) and/or dimethylaminoethyl(meth)acrylate (DMAEMA).

8. A method according to claim 1 wherein said insoluble resinous particles are <500 $\mu$.

9. A method according to claim 1 wherein said substantially water-insoluble polymer is a crosslinked or branched polymer, optionally neutralized and/or functionally neutralized, and/or quaternized, and/or functionalized quaternized.

10. A method according to claim 1 wherein the weight ratio of (a):(b) is 20–95% to 5–80%.

11. A method according to claim 1 wherein said ratio is 20–75% to 25–80%.

12. A method according to claim 9 wherein said polymer is crosslinked with a crosslinking agent which is a substantially water-insoluble compound selected from pentaerythritol triallyl ether (PETE) and pentaerythritol tetraacrylate (PETA).

13. A method according to claim 12 wherein said crosslinking agent is present in an amount of 0.02–0.5% by weight of said composition.

14. A formulation including the hydrogel of claim 5.

15. A film of the hydrogel of claim 5 on a substrate.

* * * * *